May 20, 1969     H. C. HUBBARD     3,445,622
WELDING CONTROL
Filed May 23, 1966
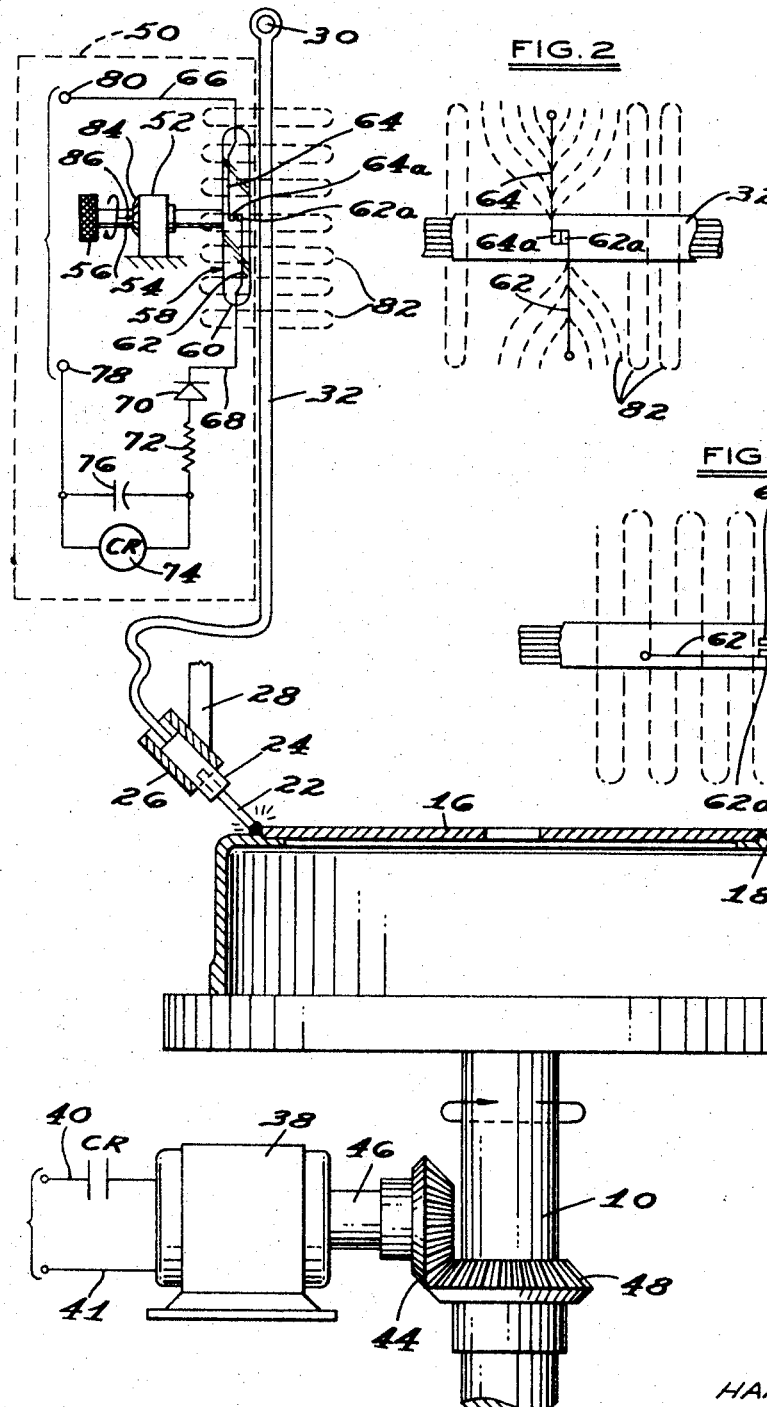
INVENTOR.
HAROLD C. HUBBARD
BY
ATTORNEYS 3,445,622
WELDING CONTROL
Harold C. Hubbard, Lansing, Mich., assignor to Motor Wheel Corporation, Lansing, Mich., a corporation of Ohio
Filed May 23, 1966, Ser. No. 552,112
Int. Cl. B23k 9/12
U.S. Cl. 219—124               7 Claims

ABSTRACT OF THE DISCLOSURE

A control system for controlling movement of a workpiece relative to a welding electrode along the seam to be arc welded in which a magnetic contact switch, of the type having a pair of flexible magnetizable reeds disposed with their adjacent ends in overlapping relation to define a contact gap therebetween, is positioned to be actuated by the magnetic field generated by a flow of a predetermined welding current in a conductor of the welding circuit. The magnetic switch is connected in a control circuit operable to halt movement of the workpiece past the electrode in response to actuation of the switch. Either AC or DC welding current may be sensed without changing the components of the control circuit.

---

This invention relates to magnetically actuated controls and to a welding control system for controlling an arc welding machine.

An object of the present invention is to provide a simple and reliable control adapted to sense current density in a conductor and to control a secondary circuit as a function of conductor current density without requiring any mechanical or electrical connection to the conductor nor any source of excitation energy other than the field generated by the conductor current.

Another object is to provide a control of the above character which is highly sensitive, fast acting, versatile and easily adjustable to respond to the value of conductor current density desired for a particular weld.

Still another object is to provide an improved welding control and apparatus for controlling the feed of the work being welded relative to the welding electrode as a function of welding current density in an arc welding machine.

Other objects, features and advantages of the present invention will become apparent from the following detailed description taken in conjunction with the accompanying drawing wherein:

FIG. 1 is a simplified semischematic side elevational view of arc welding apparatus adapted for continuous circular seam welding of objects such as brake drums, wheels or the like and incorporating a schematic diagram of the control system of the present invention for controlling the position of the work in response to the condition of the welding arc.

FIG. 2 is a fragmentary semischematic diagram illustrating a maximum sensitivity position of the magnetic switch contacts of the control relative to the welding current conductor.

FIG. 3 is another semischematic view similar to FIG. 2 but illustrating the magnetic switch contacts in their minimum sensitivity position.

Referring in more detail to FIG. 1, a direct current arc welding machine of well known construction, such as that shown in United States Patent 1,550,651 includes an upright shaft 10 journalled on a suitable support (not shown). Shaft 10 carries at its upper end a horizontal rotary table 12 adapted to support the work to be welded for rotation about a vertical axis. By way of example, the work is shown as a brake drum comprising a drum ring 14 and a disc-like back 16 which is centered on ring 14 as by seating the back in a circumferential notch of the ring flange 18 and then clamping these parts in assembled relation to the table by suitable clamps (not shown). The welding machine is adapted to arc weld a circular continuous seam 20 at the junction of the outer periphery of back 16 and the adjacent surface of flange 18. This weld is produced by a conventional welding head including a consumable weld metal electrode 22 fed by an electrode holder 24 supported for axial movement in a telescopic holder 26 mounted on a support 28. Welding current is fed to electrode 22 from one terminal 30 of a direct current power supply (not shown) by a welding cable 32 connected through head 24 to electrode 22. In addition to the welding head and cable 32, the welding circuit includes the brake drum, table 12 and a conductor 34 connecting the table to the other terminal 36 of the power supply. By way of example, terminals 30 and 36 are shown adapted for connection to the positive and negative terminals, respectively, of the power supply.

It is also to be understood that the present invention is applicable to alternating current arc welding, in which case terminals 30 and 36 may be suitably connected to a conventional AC source of welding current.

An electric motor 38, energized via leads 40 and 41 from a suitable source of power and under the control of normally open contacts of a relay CR, rotatably drives table 12 via a bevel gear 44 mounted on the motor shaft 46 and a bevel gear 48 fixed to shaft 10. Although this driving arrangement is intended to impart rotary motion to the workpiece for the production of a circular seam weld, it is to be understood that it is within the scope of the present invention to utilize other electrically driven material feeding apparatus of well-known construction, such as linear conveyors for straight line seam welds, or the like.

In accordance with the principal feature of the present invention, relative motion between the work and electrode 22 is controlled by a control device 50 which includes the structure encompassed by the broken line block of FIG. 1. Control device 50 comprises a support 52 in which is journalled a shaft 54 having a turn knob 56 fixed on one end thereof and a magnetic contact switch 58 suitably fixed on the other end thereof. Switch 58 preferably comprises a well-known dry reed type of switch as shown, for example, in United States Patents 2,289,830 and 3,056,868. Such a switch consists of a gas-filled tubular envelope 60 having flexible magnetizable reeds 62 and 64 sealed into either end thereof. Reeds 62 and 64 are of low electrical and magnetic impedance and may be composed of any suitable material, such as pure iron or iron-nickel alloys. Envelope 60 protects reeds 62 and 64 from corrosion and contains a noncorrosive gas atmosphere. The portions of reeds 62 and 64 inside envelope 60 are cantilevered from the opposite ends thereof and are disposed approximately parallel to one another. Reeds 62 and 64 terminate within envelope 60 in spaced, overlapping relation to define contact gap 62a–64a therebetween. The portions of reeds 62 and 64 extending externally of envelope 60 and are respectively connected to leads 66 and 68 of the motor control circuit. Lead 68 connects switch 58 in series with a semiconductor diode rectifier 70, a limiting resistor 72 and a parallel combination of a coil 74 of relay CR and a capacitor 76. This control circuit of device 50 has suitable terminals 78 and 80 adapted for connection to a source of alternating current, preferably 60 cycle 110 volts AC and preferably constituting the same source to which the motor leads 40, 41 are connected. Coil 74 is adapted upon energiztaion in response to closure of contacts 62a and 64a of switch 58 to pull in relay contacts CR. When thus indirectly connected to the motor energizing circuit, switch 58 serves as an on-off control for motor 38, depending upon whether contacts 62a, 64a are closed or open respectively. Alternatively, switch 58 may be connected for directly controlling energization of motor 58 by suitably incorporating switch 58 directly in the motor energizing circuit wherein switch 58 replaces the contacts of relay CR. However, direct control is normally feasible only where the current rating of switch 58 is compatible with the rating of motor 38 and in those applications wherein only DC welding current is employed in the welding circuit.

Preferably, switch 58 is secured to shaft 54 such that reeds 62, 64 are oriented perpendicular to and coincident with the shaft axis. Also, support 52 is positioned in fixed relationship to a linearly extending portion of conductor 32 with the axis of shaft 54 perpendicular to conductor 32 and envelope 58 adjacent but slightly spaced from conductor 32. With this mounting, switch 58 may be rotated in a plane parallel to conductor 32, preferably through an arc of 90° whereby at the end limits of their angular travel the reeds are positioned generally parallel to conductor 32 (FIGS. 1 and 3) and perpendicular to conductor 32 (FIG. 2) respectively.

Considering first the operation of the control system for DC welding current applications, the welding cycle is initiated by first lowering rod 22 into contact with the backdrum joint and then withdrawing the rod a short distance to strike a welding arc. Other conventional arc initiating systems may also be used. As soon as direct current starts flowing in conductor 32, a unidirectional magnetic field is generated therearound, as indicated by the concentric magnetic lines of force 82 disposed in planes perpendicular to conductor 32, the field strength of which is proportional to current density in conductor 32. Since reeds 62 and 64 have low magnetic impedance, they form a better conductive path for the magnetic lines of force than does the atmosphere surrounding conductor 32. When contacts 62a and 64a are in their normally open condition, the lines of force intersecting and conducted by the reeds create a magnetic potential difference between the reeds where they overlap at the contact gap 62a–64a. When this potential difference is sufficiently great, i.e., when sufficient magnetic flux flows across contact gap 62a–64a to satisfy the rotatably adjusted pull-in rating of switch 58, the contacts are magnetically attracted into contact to thereby electrically connect the external circuit components connected to the terminal portions of reeds 62 and 64. In the illustrated embodiment, closure of contacts 62a, 64a completes the motor control circuit through lead 66 on one side and lead 58, diode 70, resistor 72 and coil 74 to terminal 78 on the other side. Diode 70 is selected to conduct alternate half-cycles of the AC current provided across terminals 78 and 80, thereby energizing coil 74 with pulsating DC current which is smoothed and averaged by capacitor 76. Such energization of coil 74 is adapted to pull in and hold closed the contacts CR to thereby energize motor 38 which in turn initiates rotation of table 12 and the work clamped thereto.

As is well known in the art, dry reed switches are extremely sensitive and fast operating and will pull in at a fairly precise DC magnetic field strength, which in accordance with the above example of the present invention is directly generated by the direct current flowing in welding circuit conductor 32. For a switch 58 having a given sensitivity rating, the minimum current flow or density in conductor 32 necessary to close the switch contacts will depend upon the orientation of switch 58 relative to conductor 32. When switch 58 is in the position shown in FIGS. 1 and 3 with the reeds parallel to conductor 32, the lines of force 82 intersect the reeds at right angles and hence the switch is in its least sensitive position; that is, a much greater field strength is required to close contacts 62a, 64a than is the case when the reeds are disposed perpendicularly to conductor 32, as shown in FIG. 2, and thus parallel to the planes of the lines of force 82. Consequently, the pull-in rating of switch 58, as a function of welding current amperes in conductor 32, may be varied between predetermined minimum and maximum values merely by turning knob 56 to thereby rotate switch 58 between the FIG. 2 and FIG. 3 positions.

Preferably, support 52 is provided with a calibrated dial 84 and shaft 54 is provided with a suitable marking, such as an arrow 86, adjacent dial 84 so that the angular position of switch 58 relative to the axis of conductor 32 may be easily read off dial 84. For convenience, the indicia on dial 84 may be expressed in terms of welding current amperes, or in some other unit correlated with the type of welding operation under consideration.

After the welding arc has been struck and the arc gap properly adjusted, the DC welding current will increase to a predetermined value corresponding to the proper arc current for the particular welding operation. With switch 58 oriented to sense this predetermined welding current, the magnetic field generated around welding cable 32 by this predetermined current flowing therethrough will cause the contacts of the magnetic reed switch to close, thereby causing motor 38 to rotate worktable 12 and the brake drum clamped thereto at a predetermined speed correlated with feed of electrode 22 in the usual manner to produce a continuous seam weld 20 at the back-ring joint. Normally, the weld is completed by the drum and table turning through one revolution, whereupon motor 38 is deenergized, either by some additional control device, such as limit switch (not shown), or by the contacts 62a, 64a reopening in response to a reduction in the welding current caused by the beginning of the welded seam passing under the rod. Welding current may be manually shut off as work travel is thus halted, or a suitable control may be provided for opening the welding circuit when motor 38 is deenergized in response to opening of switch 58.

From the foregoing description, it will now be apparent that the control system of the present invention provides a very simple and economical arrangement for controlling movement of the workpiece as a function of current density in the welding circuit. Control device 50 enables greater reliability to be achieved in the welding operation by insuring consistent, high strength welds; i.e., it does not permit movement of the work until and unless a predetermined minimum arc current is being drawn in the welding circuit indicative of a proper low resistance welding path between terminals 30 and 36. Thus, if for some reason there is an improper high resistance in the path, e.g., due to mispositioning of the work relative to the electrode or improper clamping of the work on the table, failure of the work to start moving will make these conditions immediately apparent to the operator, thereby preventing a faulty weld. In addition, should the arc current drop during the welding operation, due to such causes as improper feed rate of the consumable welding rod 22, uneven consumption of rod 22, wander of the part joint out of the path of travel of the rod or sudden voltage drops in the welding circuit due for example to start-up of other welders on the same power line, the resulting current drop will cause switch 58 to open and thereby stop rotation of the work, thereby immediately indicating both the presence of a potential weld defect and the point where the same has occurred.

In accordance with another important feature of the present invention, control device 50 as constructed in accordance with the foregoing example is applicable without modification to the control of an AC arc welding machine to perform control functions such as control of work feed as described previously. However, in AC welding current applications movement of the work relative to the electrode is controlled as a function of the R.M.S. alternating current density in welding current conductor 32. Considering the operation of the control circuit in this mode, assume that the control circuit is connected for controlling the usual AC welder where 60-cycle alternating welding current is connected from a power source across terminals 30 and 36 of the welding circuit. A magnetic field 82 will be generated around conductor 32 which varies in strength in phase with the amplitude of the alternating current, rising from zero to maximum intensity and then decreasing to zero again in one direction and then reversing and increasing to a maximum and decreasing to zero again in the opposite direction in each cycle. At some given AC amperage of welding current in conductor 32, the strength of the magnetic field at peak intensity during each half cycle will be sufficient to cause contacts 62a and 64a to close.

It has been found that once the switch contacts close, they do not reopen until the field intensity has diminished well below closing intensity. Once the switch contacts have been closed, they will remain closed for approximately a minimum of a one quarter of a cycle or about .125 second. Thus assuming that the R.M.S. welding current is at or above the critical switch closing value, contacts 62a and 64a will close and open twice per cycle or 120 times per second, thereby impressing "clipped" AC from the 60 cycle AC source at terminals 78 and 80 across the series parallel circuit components 70, 72, 74 and 76. Diode 70 rectifies this AC control current so that unidirectional pulses of approximately .125 second duration are fed in every other half cycle to the parallel combination of the coil of relay CR and capacitor 76. In accordance with the present invention the values of these components are selected so that the capacitance and resistance produce a charge rate of capacitor 76 sufficient to store a charge so that upon subsequent discharge thereof across the parallel connected coil 74 of relay CR during the period of zero current flow (contacts 62a, 64a open), coil 74 is energized with sufficient current to hold the contacts CR.

Should the welding current strength rise above the critical level, contacts 62a and 64a will respond by closing earlier in the half cycle and opening somewhat later, thereby increasing the average current flow conducted through switch 58 per cycle. This in turn is reflected as an increase in energizing current for relay coil 74 and hence will not further affect its holding-in function relative to contacts CR. However, should welding current strength fall below the critical level for a period of more than a few cycles, contacts 62a and 64a will open on the first such cycle and then remain open, thereby cutting off charging pulses to capacitor 76. Hence capacitor 76 will completely discharge through relay coil 74, thereby causing contacts CR to open to deenergize motor 38 and thus stop the work feed.

Due to the previously described adjustable mounting, the orientation of switch 58 relative to the AC induced magnetic field may be varied to change the response level of the switch 58 in the same manner as described previously with respect to DC welding current. However, the calibration will differ for AC and therefore another indicating dial similar to dial 84 may be provided calibrated for AC welding current.

By way of illustration and not by way of limitation, successful results have been obtained with the following values for the components of the control circuit described previously herein:

| | |
|---|---|
| Diode 70 | International rectifier, 1 ampere, type 10D4. |
| Resistor 72 | 200 ohms. |
| Relay CR | Potter & Brumfield KRP11DG, 110 volts DC. |
| Capacitor 76 | 5 microfarads, 400 volts D.C. |
| Switch 58 | General Electric reed switch, 64–13–G.E.–X7. |

I claim:

1. A control system for controlling an electrical device as a function of the alternating or direct current density in an electrical conductor of the device comprising a magnetic contact switch, means mounting said switch adjacent said conductor for actuation by the magnetic field generated by flow of current in said conductor, a control circuit including a source of control current, a coil of a relay and said switch connected in series in said control circuit, and a controlled circuit in said device including a pair of contacts controlled by energization and deenergization of said relay coil in response to closure and opening said switch caused by variations in the strength of said field, said source of control current comprising a source of alternating current at a given frequency, said control circuit further including a capacitor in parallel with said relay coil and rectifier means in series with the parallel combination of said relay coil and capacitor, said source frequency being correlated with the frequency of current in said conductor such that said magnetic switch closes in response to a minimum value of current in said conductor twice per cycle of said control current, said rectifier means being adapted to rectify the pulsating alternating current potential impressed thereacross by said closure of said switch to thereby repetitively charge said capacitor and thereby maintain said relay coil energized in response to closure of said magnetic switch at the frequency of the current in said conductor.

2. A control system for controlling work-electrode travel in an arc welding machine comprising, a welding circuit including a welding electrode and a conductor for the welding current connected to said electrode, said welding circuit being adapted for connection across a workpiece, drive means for causing relative movement of the workpiece and said electrode along a seam to be arc welded, a magnetic contact switch disposed for actuation by the magnetic field generated by flow of a predetermined current in said conductor said switch comprising a pair of flexible magnetizable reeds disposed with their adjacent ends in overlapping relation to define a contact gap therebetween, and means operably electrically connecting said switch to said drive means for controlling relative movement of the workpiece and electrode in response to actuation of said switch.

3. The combination set forth in claim 2 including means for supporting said switch for rotation about an axis extending substantially perpendicular to said reeds and said conductor.

4. The combination set forth in claim 3 wherein said switch support means comprises a support positioned in fixed relation to said conductor, a shaft journalled in said support, said shaft carrying said switch thereon adjacent said conductor, means for rotating said shaft and means on said shaft and support for visibly indicating the relative angular position of said shaft and support.

5. The combination set forth in claim 4 wherein said drive means comprises an electric motor, a source of power for said motor, and a motor energizing circuit for connecting said power source to said motor for energizing the motor, said last-mentioned means set forth in claim 4 comprising a relay having a coil in circuit with said switch and normally open contacts connected as an on-off switch in said motor circuit.

6. A control system for controlling an electrical device as a function of the alternating or direct current density in an electrical conductor of the device comprising a magnetic contact switch having a pair of flexible magnetizable reeds disposed with their adjacent ends in overlapping relation to define a contact gap therebetween, means mounting said switch adjacent said conductor for actuation by the magnetic field generated by flow of current in said conductor, a control circuit including a source of control current, a coil of a relay, a diode rectifier and said switch connected in series in said control circuit, a capacitor connected in said control circuit in parallel with said relay coil, and a controlled circuit in said device including a pair of contacts controlled by energization and deenergization of said relay coil in response to closure and opening of said switch caused by variations in the strength of said field.

7. The combination set forth in claim 5 wherein said means operably electrically connecting said switch to said drive means further includes a diode rectifier in series with said magnetic contact switch and said coil of said relay and a capacitor connected in parallel with said coil of said relay.

References Cited

UNITED STATES PATENTS

| | | | |
|---|---|---|---|
| 1,550,651 | 8/1925 | Charter | 219—124 |
| 2,289,830 | 7/1942 | Ellwood | 335—152 |
| 2,679,620 | 5/1954 | Berry | 219—124 |
| 2,745,935 | 5/1956 | Powley | 219—124 |
| 3,021,419 | 2/1962 | Rascati et al. | 219—125 |
| 3,056,868 | 10/1962 | Jacobson et al. | 335—153 |
| 3,187,158 | 6/1965 | Foster | 219—124 |
| 3,267,251 | 8/1966 | Anderson | 219—125 |

RICHARD M. WOOD, *Primary Examiner.*

W. DEXTER BROOKS, *Assistant Examiner.*

U.S. Cl. X.R.

219—130

UNITED STATES PATENT OFFICE
CERTIFICATE OF CORRECTION

Patent No. 3,445,622                      May 20, 1969

Harold C. Hubbard

It is certified that error appears in the above identified patent and that said Letters Patent are hereby corrected as shown below:

Column 2, line 70, "energiztaion" should read -- energization --. Column 6, line 35, "conductor" should read -- conductor, --; line 58, claim reference numeral "4" should read -- 2 --.

Signed and sealed this 14th day of April 1970.

(SEAL)
Attest:

Edward M. Fletcher, Jr.                  WILLIAM E. SCHUYLER, JR.
Attesting Officer                       Commissioner of Patents